United States Patent [19]

Savit

[11] 4,182,428
[45] Jan. 8, 1980

[54] HYDRAULICALLY-COUPLED, LAND SEISMIC SIGNAL SOURCE

[75] Inventor: Carl H. Savit, Houston, Tex.

[73] Assignee: Western Geophysical Company of America, Houston, Tex.

[21] Appl. No.: 896,942

[22] Filed: Apr. 17, 1978

[51] Int. Cl.² ............................................... G01V 1/04
[52] U.S. Cl. .................................. 181/114; 181/119; 181/120; 181/401
[58] Field of Search ............... 181/106, 113, 114, 119, 181/401, 120

[56] References Cited

U.S. PATENT DOCUMENTS

| 3,310,128 | 3/1967 | Chelminski | 181/119 |
| 3,642,089 | 2/1972 | Parker | 181/120 |
| 3,670,839 | 6/1972 | Savit | 181/120 |
| 3,701,968 | 10/1972 | Broding | 181/119 |
| 3,712,408 | 1/1973 | Muniz | 181/120 |
| 3,770,080 | 11/1973 | Laurent et al. | 181/120 |
| 3,833,087 | 9/1974 | Cholet | 181/120 |
| 3,840,090 | 10/1974 | Silverman | 181/119 |
| 4,108,271 | 8/1978 | Chelminski | 181/119 |
| 4,116,301 | 9/1978 | Fair | 181/119 |

Primary Examiner—Howard A. Birmiel
Attorney, Agent, or Firm—William A. Knox

[57] ABSTRACT

The seismic source consists of a tank for containing a volume of water. The tank is held in firm contact with the ground by suitable weighting means. The tank wall that contacts the ground is thinner than the other walls. The volume of water in the tank is pressurized to one to three atmospheres. An imploder is mounted in the tank, submerged in the water. When the imploder is fired, reducing the tank pressure abruptly, a negative pressure pulse is generated in the water. The negative pressure pulse is transmitted from the water, through the thin ground-contacting wall, to the ground, producing an acoustic pulse whose first motion is one of rarefaction.

3 Claims, 4 Drawing Figures

U.S. Patent    Jan. 8, 1980    4,182,428
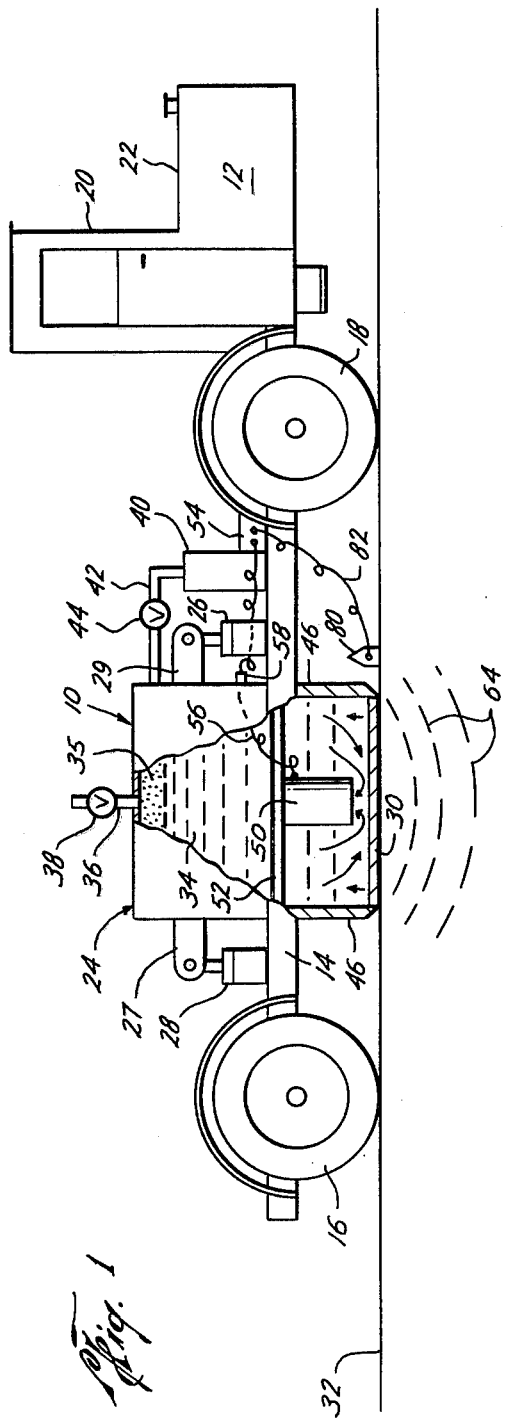
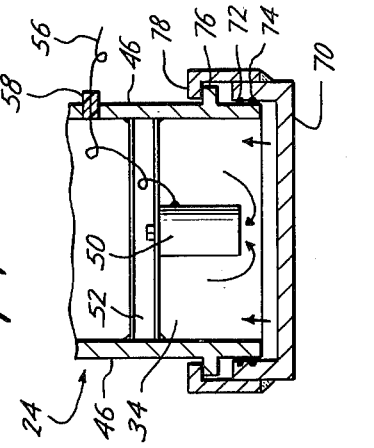

HYDRAULICALLY-COUPLED, LAND SEISMIC SIGNAL SOURCE

BACKGROUND OF THE INVENTION

1. Field of the Invention

This invention relates to seismic sound sources for use on land. In particular, it is concerned with imploders.

2. The Prior Art

Seismic sound sources, for use on land, customarily are designed to impart a compressional acoustic wave into the earth whose first motion is downwards in a pushing motion. As is well known, longitudinally-propagating seismic waves (technically known as compressional or P-waves), generate alternate compressional and rarefactional stresses on the elastic earth. All known prior-art sound sources used on land, generate wave forms whose first motion is compressional. The seismic literature is replete with descriptions of such sources including explosives, thumpers (weight-drop systems such as hammers or the like) underwater sparkers that are discharged in water-filled holes in the ground, air guns and gas guns.

In the matter of vehicle-mounted air guns, a large tank of water is provided. Two or three air guns are mounted in a single, closed tank of water. The tank is pressed against the ground by the combined weights of water itself and that of the transporting vehicle. Air under several thousand pounds is admitted to the gun. When the air is discharged, a powerful compressional or P-wave is suddenly generated, whose initial phase is compressional. The inertia of the water mass serves as a reaction mass to more efficiently transfer the acoustic signals into the ground.

Although the air-gun-water-tank system is known and used commercially, it has many disadvantages. First, because of the very high air pressures, 2000 to 6000 psi, that are needed, a large air compressor is required. Usually rated at 80–120 ft$^3$/min the compressor requires an auxiliary drive engine of up to 80 HP. Additionally, because the high-pressure air must be vented from the water tank, an elaborate set of baffles is necessary to keep the water from blowing out of the tank after each shot. Further, the downward compressional force adversely compacts the ground, particularly if it is soft, and leaves undesired depressions thereon.

Typical prior-art hydraulic signal generators similar to the one discussed above, are described in U.S. Pat. Nos. 3,310,128; 3,779,335; 3,800,907, all to Chelminski, and U.S. Pat. No. 4,008,784 to Bays.

SUMMARY OF THE INVENTION

It is an object of this invention to provide a greatly simplified hydraulic seismic sound source.

In a preferred embodiment, the sound source consists of a tank for containing a volume of water. The tank is mounted on a vehicle that has means for removably placing the tank in contact with the ground and for applying the vehicle weight thereto, so as to apply a pre-loading force to the ground. The ground-contacting portion of the tank wall is thinner than the remainder of the walls.

A small air pump maintains a pressure of up to three atmospheres within the tank to provide a hydrostatic head. An imploder device is mounted inside the tank, submerged in the water. When the imploder is actuated, the hydrostatic head in the tank is momentarily sharply reduced. The pressure reduction causes the thin wall to retract slightly, removing some of the previously applied pre-loading force from the ground. The abrupt, momentary removal of the pre-loading force generates a seismic P-wave having an initial rarefaction phase.

BRIEF DESCRIPTION OF THE DRAWINGS

The further objects and advantages of this invention may be better understood by reference to the attached detailed description of a preferred embodiment and the drawings wherein:

FIG. 1 is a schematic view of the Siesmic Signal Source of this invention, partly cut away to more clearly show interior details;

FIG. 2 illustrates the ground motion due to the impulsive application of a force to the ground surface;

FIG. 3 illustrates the ground motion due to impulsive release of a force from the ground surface; and FIG. 4 is a cross sectional view of an alternate embodiment of the transducer element of the Seismic Signal Source.

DETAILED DESCRIPTION OF A PREFERRED EMBODIMENT OF THE INVENTION

Referring now to FIG. 1, there is illustrated a Seismic Signal generator 10, mounted on a vehicle 12. Vehicle 12 may be of any suitable type, but is shown as a conventional, flat bed truck having a bed 14, wheels 16, 18, and a driver's cab 20 including an engine compartment 22.

A large preferably cylindrical tank 24, is mounted through bed 14 of truck 12, approximately midway between wheels 16 and 18. Tank 24 may be lowered through bed 14 of truck 12 by means of hydraulic jacks 26, 28 of any suitable design, attached to lugs 27 and 29 welded to tank 24 to allow the bottom wall 30 of tank 24 to rest on the ground surface 32. When the vehicle is to be moved, jacks 26 and 28 raise tank 24 clear of the ground.

Tank 24 is nearly filled with water 34 (as shown in the cutaway part of the tank) through inlet 36 that may be closed by a shutoff valve 38. The volume inside tank 24, above water 34, forms an air space 35 and is pressurized with compressed air having a pressure of one to three atmospheres (15–45 psi) by means of air compressor 40 through air line 42 and shutoff valve 44. The amount of the air space 35 should be quite small and should not occupy more than 1% of the total volume. Alternatively the pressurizing air may be in a separate container and may communicate its pressure to the tank by means of a pipe or tube, or pressure may be applied mechanically or hydraulically. Since, in operation, the tank is sealed by valves 38 and 44, no air escapes. Hence compressor 40 could easily be replaced by one or more high-pressure prefilled air bottles, thus simplifying the installation.

Side wall 46 as well as the top wall (not shown in section) are relatively thick, such as $\frac{1}{2}''$ to $\frac{3}{4}''$. Bottom wall 30 is much thinner, on the order of $\frac{1}{8}''$ to $\frac{1}{4}''$. Bottom wall 30 must be sufficiently flexible so that a change in pressure inside the tank will result in an appreciable deformation of that wall while the same change in pressure has a much smaller effect on the other walls of the tank.

Inside tank 24 and immersed in water 34 is an imploder device 50 suspended from a support such as an I-beam 52 welded or bolted to the inner wall of tank 24.

A suitable imploder is described in U.S. Pat. No. 3,642,090 filed July 23, 1969 and assigned to the assignee of this invention, and is included herein by reference. The imploder 50 includes a housing that defines an enclosed chamber having a movable wall. Driving means in one operating condition cause the movable wall to execute a forward stroke in the water, thereby storing potential energy in the water, in the air in chamber 35, and in the imploder. In another operating condition, the operating means causes the movable wall of the imploder to abruptly execute a return stroke, thereby creating a momentary sudden, impulsive pressure drop in the water 34 in tank 24. In a preferred embodiment, the movable wall shown in the reference patent may be actuated by an electro-mechanical or hydraulic linear actuator of any well-known type. The triggering mechanism may be a solenoid-actuated latch also of any well-known type. The solenoid and linear actuator device may be activated by signals transmitted from control box 54 over wires 56 that enter tank 24 through pressure seal 58.

Tank 24 may be on the order of 6 feet in diameter and about 10 feet high. Assuming the water level to be 8 feet above the bottom wall 30, the total weight of the water will be about 14,000 pounds, assuming that water weighs 62 lb/ft³. The truck and tank may weigh 15,000 to 20,000 pounds so that a force of as much as 34,000 pounds may be applied to preload the ground surface beneath the tank.

In operation, the truck is driven to a desired location. Tank 24 is pressed against ground surface 32 under the combined weight of truck and tank 12 and 24 plus the contained water 34 to apply a preloading force against the earth. Imploder 50 is cocked. Upon command, imploder 50 is triggered by controller 54. When imploder 50 is triggered, it creates a momentary impulsive reduction in pressure when some of the water rushes in to fill the void created by imploder 50. The pressure reduction momentarily causes lower wall 30 of tank 24 to retract, thereby releasing the preloading force applied to ground surface 32. Impulsive removal of the force, creates a negative compressional wave in the earth which propagates as the desired acoustic wave. From the above, it is seen that the energy developed by the imploder 50 is hydraulically coupled to the ground.

The concept of a "negative" compressional first impulse may be better understood by reference to FIGS. 2 and 3. FIG. 2 represents the first and subsequent ground motions when pressure is applied to an elastic ground surface such as by some form of impactor as described in the prior-art references to Chelminski or Bays. Sinusoidal curve 60 is a graph of the earth motion relative to the undisturbed surface represented by line 62. In FIG. 2 an impactive device causes the ground to first move downwards as a positive, first-motion pulse as shown by the arrow. Since the earth is elastic, after the first downward movement, it rebounds upwards and an acoustic compressional or P-wave is generated. The acoustic wave radiates away from the source into the half-space defined by the earth as a nominally semicircular wave front as indicated by the circular arcs 64 (FIG. 1). In FIG. 3 the curve 60' is a graph of earth motion as generated by the seismic signal Source 10 (FIG. 1). Here, because stress or force is removed from the ground, the first ground motion is upwards as a negative first-motion pulse. Radiation of the negative pulse into the earth follows the same course as that followed by a positive pulse.

In an alternate embodiment the flexible bottom wall 30 of tank 24 may be replaced by a telescoping movable wall 70 as shown in FIG. 4. Movable wall 70 is a short cylinder concentric with wall 46, of tank 24, shown in partial view in the figure. O-ring seals 72, 74 maintain fluid-pressure integrity between tank wall 46 and movable wall 70. Retaining lug 76, welded to tank wall 46, and lug 78, welded to movable wall 70, hold the parts together when tank 24 is raised from the ground for transportation. Sufficient air pressure is applied to water 34 to hold movable wall 70 in the extended position as shown in FIG. 4. As little as 10 psi is a sufficient pressure to extend movable wall 70 against the static pressure due to the combined weight of the water 34, truck 12 and the rest of tank 24. When imploder 50 is actuated, the momentary pressure drop inside tank 24, allows movable wall 70 to move impulsively upwards as shown by the short arrows, thereby generating the desired negative compressional acoustic wave.

The invention has thus far been described in terms of the emission of a single negative compressional acoustic or seismic wave. The device can be, of course, programmed by controller 54 to rapidly emit a train of such pulses having uniformly varying, random, or pseudo-random time separation between pulses. The instants of application of the pulses of such a train are preferably monitored by a seismic sensor 80 such as a geophone positioned on the ground near bottom wall 30 (FIG. 1), or a sensor such as a hydrophone (not shown), may be mounted inside the tank 24 to detect the pressure drop when imploder 50 is actuated. Signals from sensor 80 are transmitted to controller 54 over lead 82, from where the signals may be transmitted to a seismic recording system (not shown) to be recorded on any suitable recording device such as a magnetic tape recorder.

It is to be understood that various modifications may be made by those skilled in the art without departing from the spirit or scope of my invention as taught in the description and the appended claims.

I claim as my invention:

1. A portable vehicle-mounted seismic signal generator for use in environmentally sensitive areas for generating in the earth a P-wave, having an initial negative pulse, a means for lowering said seismic signal generator below said vehicle to press said generator into ground contact to provide a preloading force and for raising said generator for transport between locations, comprising in combination:

a closed tank, having a sealed cover, mounted on said vehicle for containing a volume of water to provide a natural hydrostatic head, said tank having a lower retractable wall for contacting the ground;
   means for applying to said volume of water and to said retractable wall an artificial hydrostatic head to augment the natural hydrostatic head in said tank;
   an imploder mounted in said tank, hydraulically coupled to said volume of water;
   a control means for actuating said imploder in cooperation with the potential energy provided by the augmented hydrostatic head, so that said imploder impulsively reduces the pressure on said retractable wall to inject the desired negative-going initial pulse into the ground with minimal adverse earth compaction and environmental disturbance.

2. The acoustic source as defined in claim 1 wherein the means for applying the artificial hydrostatic head is a volume of compressed gas in communication with said volume of water.

3. The acoustic source as defined in claim 1 wherein said control means actuates said imploder at programmed intervals to provide a train of pulses having desired time separations.

* * * * *